Aug. 21, 1945. J. S. HARRIS 2,382,992
SOIL SAMPLING APPARATUS
Filed Feb. 10, 1944 2 Sheets-Sheet 1
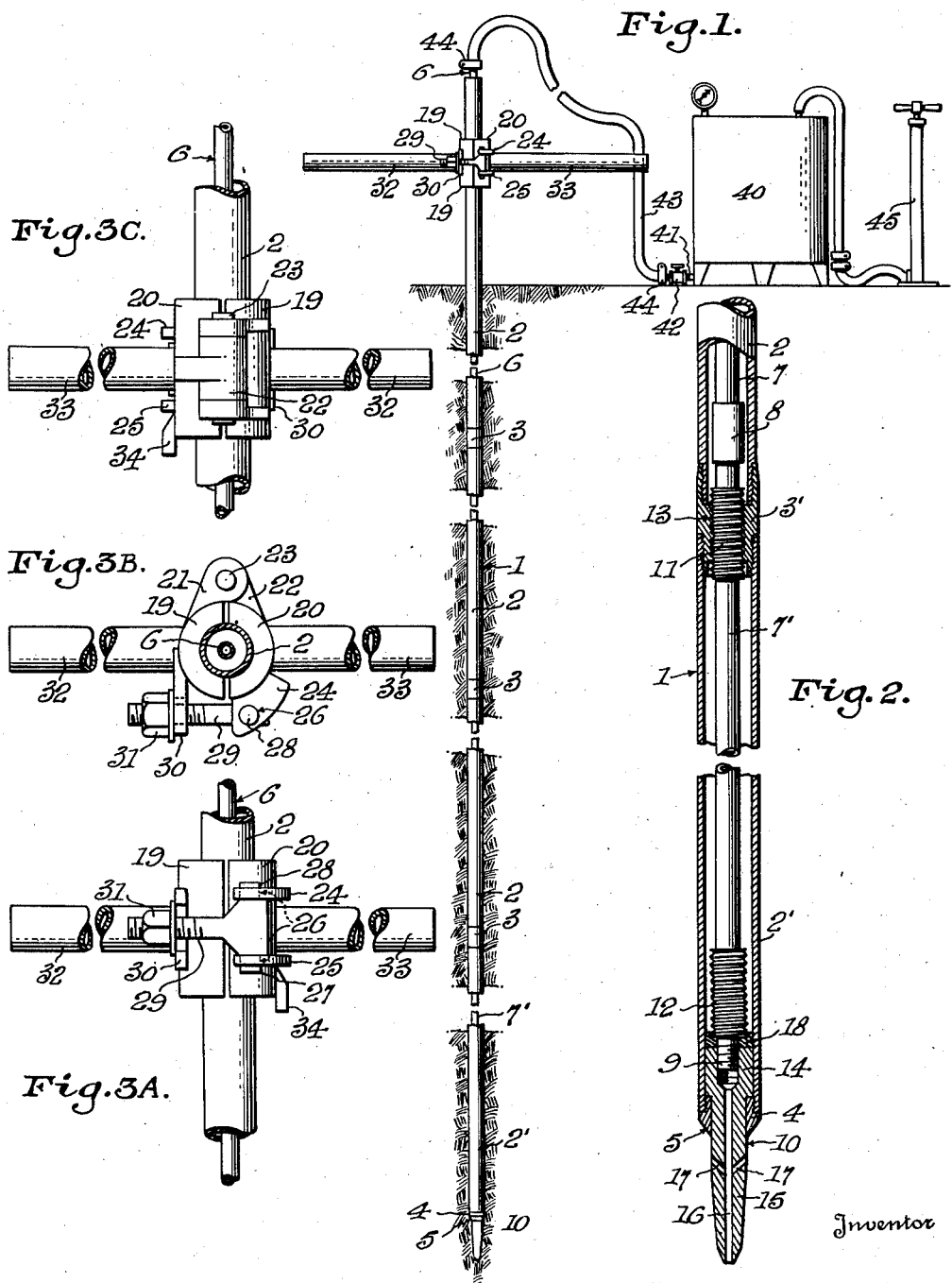
Inventor
Jesse S. Harris Aug. 21, 1945.    J. S. HARRIS    2,382,992
SOIL SAMPLING APPARATUS
Filed Feb. 10, 1944    2 Sheets-Sheet 2
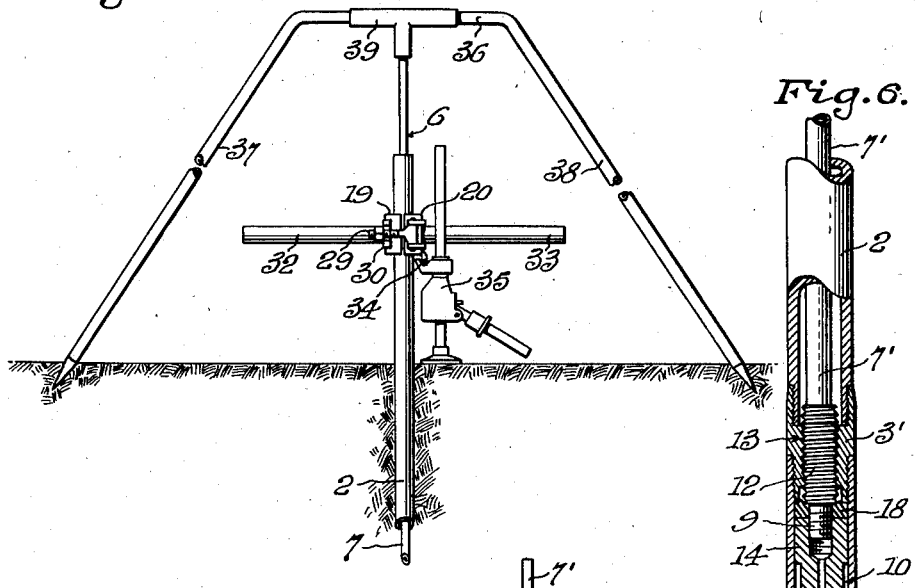
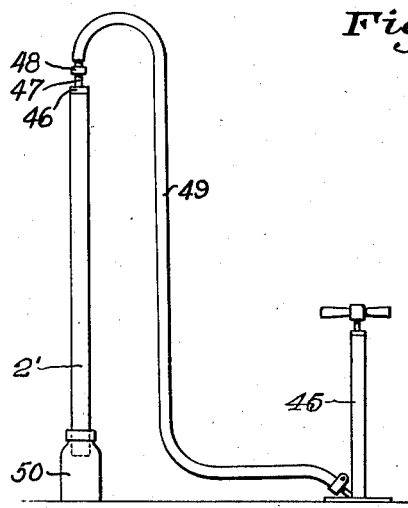
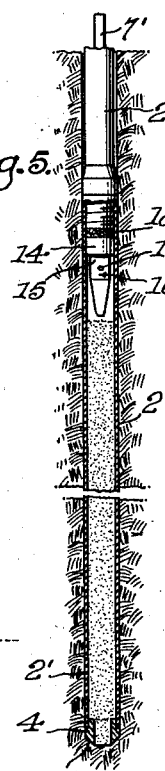
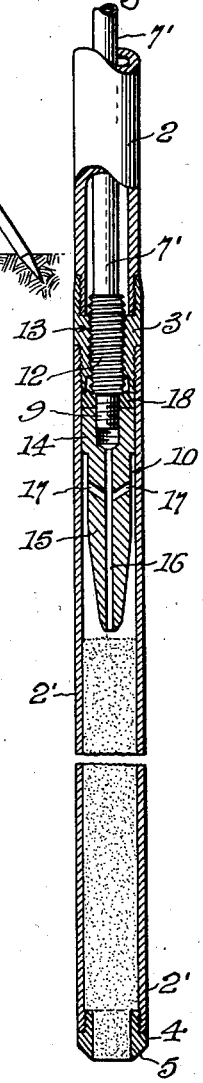
Inventor
Jesse S. Harris
By
Attorney Patented Aug. 21, 1945

2,382,992

UNITED STATES PATENT OFFICE 2,382,992

SOIL SAMPLING APPARATUS

Jesse Stewart Harris, Memphis, Tenn.

Application February 10, 1944, Serial No. 521,890

1 Claim. (Cl. 255—1.4)

(Granted under the act of March 3, 1883, as amended April 30, 1928; 370 O. G. 757)

The invention described herein may be manufactured and used by or for the Government for governmental purposes, without payment to me of any royalty thereon.

This invention relates to improved methods and apparatus for sampling soil and is directed particularly to methods and apparatus for obtaining representative samples of soil intact at various depths below the surface of the soil.

Numerous methods and special equipment have been utilized in the past for sampling soil with varying degrees of success, but among those methods and devices there is none which is entirely satisfactory. All such methods and equipment are either limited as to the depth below the surface at which soil samples can be obtained or are not adapted to obtain samples of soil intact and hence, representative of the strata from which they are taken.

It is an object of this invention to provide a new and improved soil sampling apparatus which can easily be sunk to predetermined depths below the surface of the soil and can easily obtain representative samples of soil wholly intact at such depths.

Another object is to provide a soil sampling apparatus adapted to permit forced passage of a fluid therethrough for promoting the descent of the device in the soil.

Still another object of this invention is to provide a soil sampling apparatus which may be easily sunk to a predetermined depth without contaminating the sampling tube before it reaches the desired depths.

A further object of this invention is to provide a soil sampling apparatus comprising a sampling tube having a water conduit concentrically disposed within the tube in which the sampling tube and the conduit may be longitudinally moved with respect to each other and selectively secured in different relative positions.

A still further object of this invention is to provide an inexpensive soil sampling apparatus which may be manually operated, efficiently and economically to obtain representative soil samples at predetermined depths below the surface of the soil.

Other objects will be apparent from the following description of the invention and the accompanying drawings, in which:

Figure 1 is an elevational view showing the soil sampling apparatus in operation in a soil cavity;

Figure 2 is a longitudinal sectional view showing in enlarged detail the lower portion of the soil sampling apparatus with the elements thereof in drilling position;

Figures 3A, 3B and 3C are front and rear elevational and top plan views respectively of the detachable handle for the sampling device;

Figure 4 is an elevational view showing the upper portion of the sampling apparatus;

Figure 5 is a longitudinal view partly in section showing the lower portion of the soil sampling apparatus with the elements thereof in sampling position and in operation in a soil cavity;

Figure 6 is a longitudinal sectional view showing in enlarged detail the lower portion of the sampling apparatus with the elements thereof in sampling position;

Figure 7 is an elevational view showing one method of removing the soil sample from the apparatus.

Referring to Figures 1 and 2, the soil sampling apparatus includes a sampling tube 1, made up of a series of sections 2 joined by couplings 3. Alternatively, the sections 2 may be joined by engaging external and internal screw threaded portions located at the ends of adjoining sections or by any other suitable means. In joining the sections 2, it is preferred to employ a means which will provide smooth flush joints in the outer wall of the sampling tube 1. The terminal section 2' of the sampling tube 1 is interiorly threaded at its lower end to receive an annular cutting shoe 4. The lower face of the cutting shoe 4 is inclined to form a cutting edge 5. A conduit 6, made up of a series of sections 7, joined by couplings 8, is concentrically disposed within the sampling tube 1 and is adapted for longitudinal movement therein. The lower end of the lowermost section 7' of the conduit 6, is reduced in cross-section to form a nipple 9, which is provided with screw threads for securing it to a drill point 10. The lower section 7' of the conduit 6 is provided at its upper and lower ends with a pair of enlarged threaded collars 11 and 12. The threaded collars 11 and 12 are secured to section 7' by any suitable means or may be formed integrally thereon. The lower threaded collar 12 is secured adjacent the reduced end of the conduit section 7' and the upper thread collar 11 is secured to the section 7' at a distance from the lower collar 12 approximately equivalent to the length of the sample of soil it is desired to obtain. The coupling 3' which joins the lower terminal section 2', of the sampling tube 1, to the adjacent section 2 is provided with internal screw threads 13. The screw threads 13 on the coupling 3' are adapted to selectively engage the screw threads on either the upper or lower collars 11 or 12 and thereby selectively secure the sampling tube 1 and the conduit 6 in different relative positions. While the interiorly threaded coupling 3' and the upper and lower threaded collars 11 and 12 respectively on conduit section 7' have been disclosed as the perferred means for selectively securing the sampling tube 1 to the conduit 6, other suitable engaging means may be employed for this purpose. The drill point 10 is provided with an enlarged upper portion 14 and a reduced lower portion 15 which tapers to a point at the lower end thereof. The upper portion 14 of the drill point 10 is adapted to fit in the bore of the sampling tube section 2' and contacts the inner walls thereof to serve as a guide for the conduit 6 when it is longitudinally moved in the sampling tube 1. The tapered portion 15 of the drill point 10 corresponds in diameter at the base thereof to the opening in the annular cutting shoe 4. The drill point 10 is provided with a longitudinal passage 16 which is enlarged at the upper end thereof and the enlarged portion 14 is interiorly threaded for connection to the nipple 9. The lower tapered portion 15 of the drill point 10 is provided with a plurality of angularly disposed passages 17 in the walls thereof connecting with the passage 16. An annular packing ring 18 is disposed between the threaded collar 12 on the conduit section 7' and the enlarged upper portion 14 of the drill point 10. The conduit 6 and the passages 16 and 17 provide for the flow of water through the soil sampling apparatus and into the soil around the lower end of the apparatus.

The soil sampling apparatus is provided with a detachable lifting device for removing the apparatus from the soil cavity. Referring to Figures 3A, 3B and 3C, the lifting device comprises a pair of arcuate plates 19 and 20 which are provided with a pair of hinge elements 21 and 22 through which a pin 23 passes. The hinged plates 19 and 20 are adapted to engage a section 2 of the sampling tube 1. The plate 20 has a pair of horizontal plates 24 and 25 formed thereon. The plates 24 and 25 are provided with aligned openings 26 adapted to receive the trunnions 27 and 28 formed in the base of the bolt 29 and pivotally support the latter. The bolt 29 is adapted to pass through the opening in a forked plate 30 which is formed on the arcuate plate 19. A nut 31 is adapted to engage the bolt 29 and the forked plate 30 and clamp the arcuate plates 19 and 20 on the section 2 of the sampling tube 1. A pair of handles 32 and 33 are formed on or otherwise secured to the arcuate plates 19 and 20 to provide the operator with a means for controlling and directing the sampling apparatus. The arcuate plate 20 is provided with a depending lug 34 for engaging a lifting jack 35 shown in Figure 4 which is adapted to lift the sampling apparatus out of the soil cavity. A suspension rig is also shown in Figure 4 which comprises a horizontal bar 36, and a pair of leg members 37 and 38. The horizontal bar 36, has loosely mounted thereon a T-shaped fitting 39, the depending portion of which is interiorly threaded. The threaded portion of the fitting 39 is adapted to engage the threaded upper end of the conduit 6.

A water reservoir 40 having an outlet pipe 41 provided with a valve 42 is adapted to be connected to the conduit 6 by a hose 43. The hose 43 may be connected to the outlet pipe 41 and the conduit 6 by the detachable clamps 44 or other suitable means. Any suitable source of air pressure, such as a pump 45 may be employed to produce pressure in the reservoir 40. The pressure produced in the reservoir 40 forces the water in the reservoir though the outlet pipe 41 and the hose 43 into the conduit 6 of the sampling apparatus and thence through the passages 16 and 17 in the drill point 10.

In assembling the device the cutting shoe 4 is attached to the lower end of the section 2' of the sampling tube 1. The drill point 10 is secured to the lower end of the section 7' of the conduit 6 by screwing it onto the threaded nipple 9, with the packing ring 18 disposed between the threaded collar 12 on the conduit section 7' and the enlarged upper portion 14 of the drill point 10. The conduit section 7' with the drill point 10 attached is inserted into the lower terminal section 2' of the sampling tube 1, and moved longitudinally therein until the lower tapered portion 15 of the drill point 10 extends through the annular cutting shoe 4 and the enlarged portion 14 of the drill point 10 rests on the upper edge of the cutting shoe 4. The coupling 3' is attached to the upper end of the section 2' of the sampling tube 1 and the internal screw threads 13 on the coupling 3' thereby engaged with threaded collar 11. The drill point 10 is forced against the upper edge of the cutting shoe 4 to seal the interior of section 2' of the sampling tube 1. The sampling apparatus is thus assembled with the elements thereof arranged in a position adapted for drilling. The water reservoir 40 is connected to the conduit 6 by attaching the hose 43 to the outlet pipe 41 and the upper terminal end of the conduit 6 with the detachable clamps 44. The lifting device is attached to the section 2' of the sampling tube 1 by clamping the arcuate plates 19 and 20 to the section 2 in the manner described above.

The soil sampling apparatus assembled as described above may then be inserted into the soil by the operator who manually forces it below the surface aided by the weight of the sampling apparatus and the flow of water under pressure from the passages 16 and 17 in the drill point 10. The water moistens the soil at the bottom of the soil cavity and the softening action therefrom assists in the sinking of the sampling apparatus. The flow of water from the inclined passages 17 in the drill point 10 moistens the soil adjacent the cutting edge 5 of the cutting shoe 4 and also provides a lubricating action between the sides of the cavity and the wall of the sampling tube 1. The sampling apparatus is thus sunk into the soil and additional sections coupled to the conduit 6 and the sampling tube 1 until the apparatus reaches the desired depth. When the sampling apparatus reaches the strata where it is desired to obtain a sample of the soil, the flow of water is stopped by shutting the valve 42 in the outlet pipe 41 and the hose 43 is detached from the conduit 6. The threaded portion of the T-shaped fitting 39 is attached to the threaded upper end of the conduit 6 and the legs 37 and 38 of the suspension rig forced into the surface of the soil thereby fixing the position of the conduit 6 and preventing further movement thereof. The operator then rotates the sampling tube 1 by turning the handles 32 and 33 to disengage the coupling 3' and the collar 11, and forces the lower section 2' of the sampling tube 1 into the soil. This movement is continued until the screw threads 13 on the coupling 3' engage the lower collar 12. The sample tube 1 is rotated until the enlarged portion 14 of the drill point 10 and the packing ring 18 are forced against the coupling 3' thereby securing the sampling tube 1 and the conduit 6 against further relative movement with respect to one another. The sample of soil which has been forced into the section 2' by the downward movement of the sampling tube 1 may be removed intact from the soil cavity by detaching the suspension rig from the conduit 6 and withdrawing the sampling apparatus from the soil cavity. The sample may be removed from the section 2' by disassembling the apparatus and forcing the sample out of the section 2'. In Figure 7, the method of using air pressure to force the sample from the section 2' is disclosed. In carrying out this method, the lowermost section 2' of the sampling tube 2 is removed from the apparatus by disengaging the coupling 3'. A threaded fitting 46 provided with a threaded nipple 47 is secured to the upper end of the section 2'. A standard threaded hose coupling 48 which is attached to an air hose 49 connected to the air pump 45, is then secured to the nipple 47. The annular cutting shoe 4 is removed from the lower end of the section 2' and this end is then inserted in a container 50. The pump 45 is then operated to force air into the section 2' which, in turn, forces the soil sample out of the section 2' into the container 50.

The soil sampling apparatus described is simple, inexpensive and provides a means for obtaining samples of soil representative of any particular strata. The apparatus may be operated manually to sink it to any desired depth where a sample of soil can be obtained which is free of soil from any other level of the cavity. The sample of soil thus obtained may be removed from the soil cavity and then removed from the sampling tube intact.

Having thus described my invention, what I claim as new and wish to secure by Letters Patent is:

In a soil sampling apparatus, a sampling tube, a conduit extending lengthwise thereof and adapted for longitudinal movement therein; an annular cutting member provided with an inclined cutting surface; said cutting member being secured to the lower end of said sampling tube; a drill point secured to the lower end of said conduit and being formed to engage said annular cutting member and seal the lower end of the sampling tube; said drill point being provided with a vertical fluid outlet and radially arranged, upwardly directed fluid outlets connected with said vertical fluid outlet; said vertical outlet being adapted to direct a fluid medium into the soil in advance of said apparatus; said radial outlets being adapted to direct the fluid medium into the soil adjacent the cutting surface of said annular cutting member; and interengaging means on said conduit and sampling tube for securing the conduit to the sampling tube either with the drill point positioned to seal the lower end of said sampling tube or in a position spaced above said lower end whereby to permit a sample of soil to enter the lower end of said soil sampling tube.

JESSE STEWART HARRIS.